US008035360B2

(12) United States Patent
Xia et al.

(10) Patent No.: US 8,035,360 B2
(45) Date of Patent: Oct. 11, 2011

(54) SOFT START UNIT FOR A POWER CONVERTING DEVICE

(75) Inventors: Chun-Hua Xia, Shanghai City (CN); Shih-Hao Liu, Taipei (TW)

(73) Assignee: Inventec Corporation, Taipei (TW)

( * ) Notice: Subject to any disclaimer, the term of this patent is extended or adjusted under 35 U.S.C. 154(b) by 409 days.

(21) Appl. No.: 12/416,618

(22) Filed: Apr. 1, 2009

(65) Prior Publication Data

US 2010/0207593 A1 Aug. 19, 2010

(30) Foreign Application Priority Data

Feb. 19, 2009 (TW) .............................. 98105255 A

(51) Int. Cl.
*G05F 1/59* (2006.01)
(52) U.S. Cl. ....................................... 323/271; 323/901
(58) Field of Classification Search .................. 323/271, 323/282, 351, 901
See application file for complete search history.

(56) References Cited

U.S. PATENT DOCUMENTS

| 7,576,522 | B2 * | 8/2009 | Chen et al. ..................... 323/271 |
| 7,764,053 | B2 * | 7/2010 | Mehas et al. ................... 323/222 |
| 7,782,024 | B2 * | 8/2010 | Fukushi et al. ................ 323/224 |
| 7,839,130 | B2 * | 11/2010 | Shimizu ........................ 323/282 |

* cited by examiner

*Primary Examiner* — Jeffrey Sterrett
(74) *Attorney, Agent, or Firm* — J.C. Patents

(57) ABSTRACT

A power converting device including a pulse width modulation circuit, a switch unit, a power output unit and a voltage start unit is provided. The pulse width modulation circuit increases a start voltage in a soft start mode and is operated under the start voltage to generate a pulse width modulation signal. The switch unit is for receiving an input voltage, and forming a charge path and a discharge path alternately according to the pulse width modulation signal. The power output unit converts the input voltage to a core voltage in accordance with the charge path and the discharge path. The voltage start unit is for detecting the start voltage, and for transmitting a control signal to interrupt the formation of the discharge path when the start voltage is smaller than the core voltage.

7 Claims, 2 Drawing Sheets

SOFT START UNIT FOR A POWER CONVERTING DEVICE

CROSS-REFERENCE TO RELATED APPLICATION

This application claims the priority benefit of Taiwan application serial no. 98105255, filed on Feb. 19, 2009. The entirety of the above-mentioned patent application is hereby incorporated by reference herein and made a part of specification.

BACKGROUND OF THE INVENTION

1. Field of the Invention

The present invention relates to a power converting device and particularly to a power converting device which uses a voltage start unit and a pulse width modulation circuit for performing operations.

2. Description of Related Art

In the design of a server system, application specific integrated circuits (ASICs) are commonly-used integrated chips. Integrated chips perform operations by using an input voltage and a core voltage in the server, and the server converts the input voltage into the core voltage through a power converting device. It is noted that, in order to conform to the logical design of the server, generally the sequence of providing the input voltage and the core voltage is specifically restricted, and the timing of providing the input voltage needs to be earlier than the core voltage.

In view of the above, FIG. 1 illustrates a partial circuit diagram of a conventional server. As shown in FIG. 1, a power converting device 110 switches a conductive state of a switch SW11 and a switch SW12 through a pulse width modulation circuit 111. As the switch SW11 and the switch SW12 are switched, a current flowing through an inductance L11 and a capacitor C11 is changed, so as to convert an input voltage $V_{IN1}$ to a core voltage $V_{CORE1}$. On the other hand, the input voltage $V_{IN1}$ and the core voltage $V_{CORE1}$ are supplied to and used by an application specific integrated circuit 120 of a conventional server 100. Herein, an inner transistor of the application specific integrated circuit 120 forms a circuit structure equivalent to diodes D11 and D12, and the circuit structure is electrically connected between two terminals of the power converting device 110.

However, the input voltage $V_{IN1}$ received by an input terminal TM11 of the power converting device 110 may leak to an output terminal TM12 of the power converting device 110 through the diodes D11 and D12. Consequently, when the power converting device 110 is in a soft start mode, the input voltage $V_{IN1}$ is discharged through the inductance L11 and the switch SW12, as the switches SW11 and SW12 are switched. In the meantime, the levels of the input voltage $V_{IN1}$ and the core voltage $V_{CORE1}$ are pulled down simultaneously, which results in the malfunction of the power converting device 110.

SUMMARY OF THE INVENTION

The present invention provides a power converting device which timely interrupts the formation of a discharge path according to the values of a start voltage and a core voltage. Thereby, in a soft start mode, the power converting device is immune from the influence of an application specific integrated circuit and functions normally.

The present invention provides a power converting device, including a pulse width modulation circuit, a switch unit, a power output unit, and a voltage start unit. The pulse width modulation circuit increases a start voltage in a soft start mode and operates under the start voltage to generate a pulse width modulation signal. The switch unit receives an input voltage and alternately forms a charge path and a discharge path in accordance with the pulse width modulation signal. Furthermore, the power output unit converts the input voltage to a core voltage in accordance with the charge path and the discharge path formed by the switch unit. The voltage start unit detects the start voltage and transmits a control signal when the start voltage is smaller than the core voltage, so as to interrupt the formation of the discharge path.

According to one embodiment of the present invention, the switch unit includes a first switch and a second switch. More specifically, a first terminal of the first switch is used for receiving the input voltage, and a control terminal of the first switch is electrically connected to the pulse width modulation circuit. A first terminal of the second switch is electrically connected to a second terminal of the first switch and the power output unit. A second terminal of the second switch is electrically connected to a ground, and a control terminal of the second switch is electrically connected to the pulse width modulation circuit and the voltage start unit. It should be noted that the switch unit alternately turns on either of the first switch and the second switch according to the pulse width modulation signal, so as to form the charge path when the first switch is turned on and form the discharge path when the second switch is turned on. Moreover, the switch unit breaks off the second switch according to the control signal, so as to interrupt the formation of the discharge path.

According to one embodiment of the present invention, the aforesaid voltage start unit includes an operation amplifier and a third switch. Specifically, the operation amplifier is used for receiving the start voltage and the core voltage, and outputs a detection signal when the start voltage is smaller than the core voltage. A first terminal of the third switch is electrically connected to the control terminal of the second switch, and a second terminal of the third switch is electrically connected to the ground. Furthermore, a control terminal of the third switch is electrically connected to the operation amplifier. Furthermore, the third switch turns on the first terminal and the second terminal thereof according to the detection signal, so as to generate the control signal.

Based on the above, the present invention is to operate the switch unit by using the voltage start unit and the pulse width modulation circuit. Accordingly, when the power converting device is operated in the soft start mode, the voltage start unit timely interrupts the formation of the discharge path in the switch unit. As a consequence, the input voltage which leaks to an output terminal of the power converting device through the application specific integrated circuit is not able to be discharged via the discharge path of the switch unit. In other words, during the soft start process, the power converting device is free from the influence of the application specific integrated circuit and is able to convert the input voltage into the core voltage properly.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Before moving on to the embodiments of the present invention, a power converting device as described in the following embodiments is hypothesized to be adapted for a server and able to provide an input voltage and a core voltage for use of an application specific integrated circuit in the server. However, the foregoing hypothesis is not intended to limit the present invention, and persons having ordinary knowledge in the art may vary the applications of the power converting device of the present invention at will to meet the design requirements.

Figure 1:
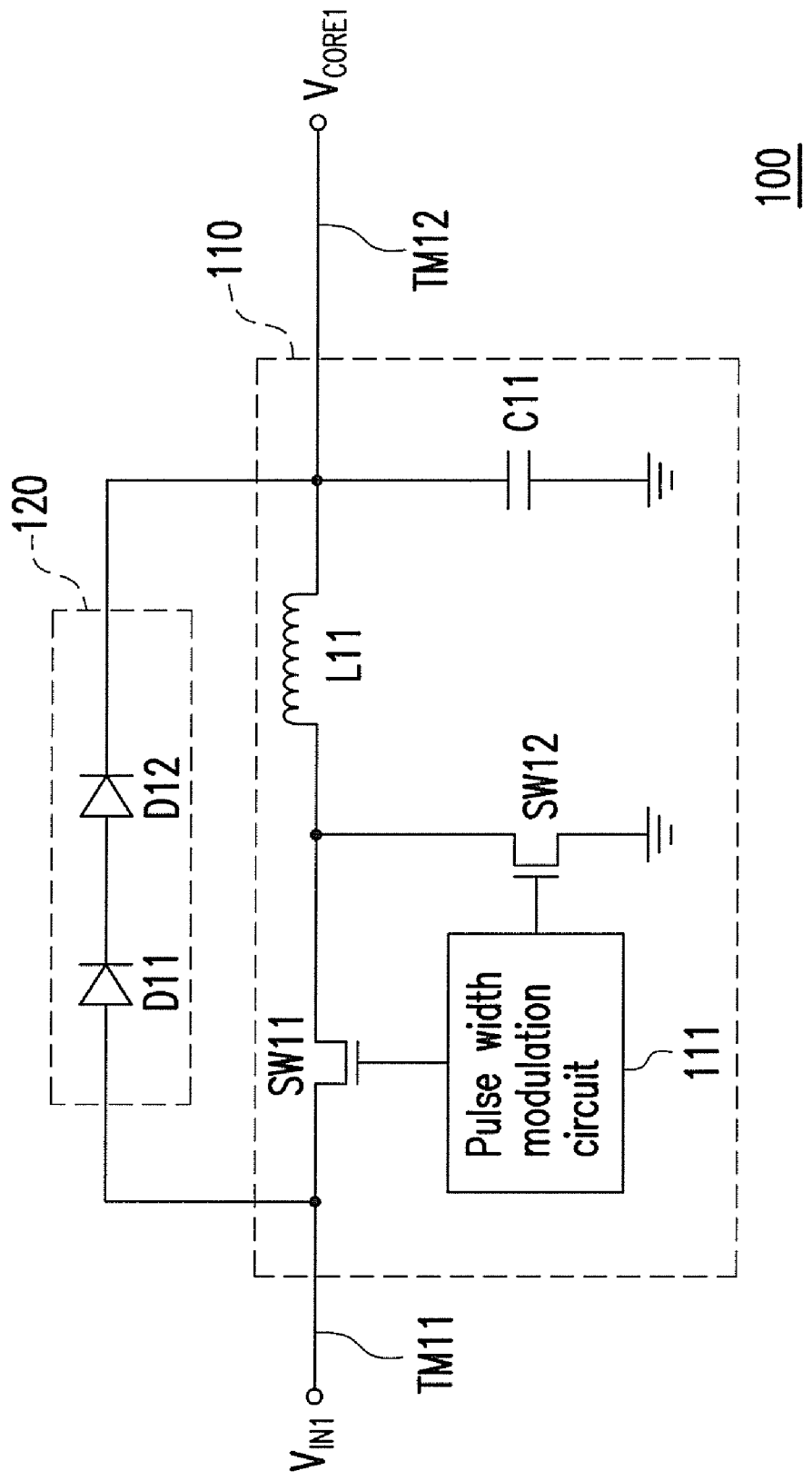
FIG. 1 is a partial circuit diagram of a conventional server.
Figure 2:
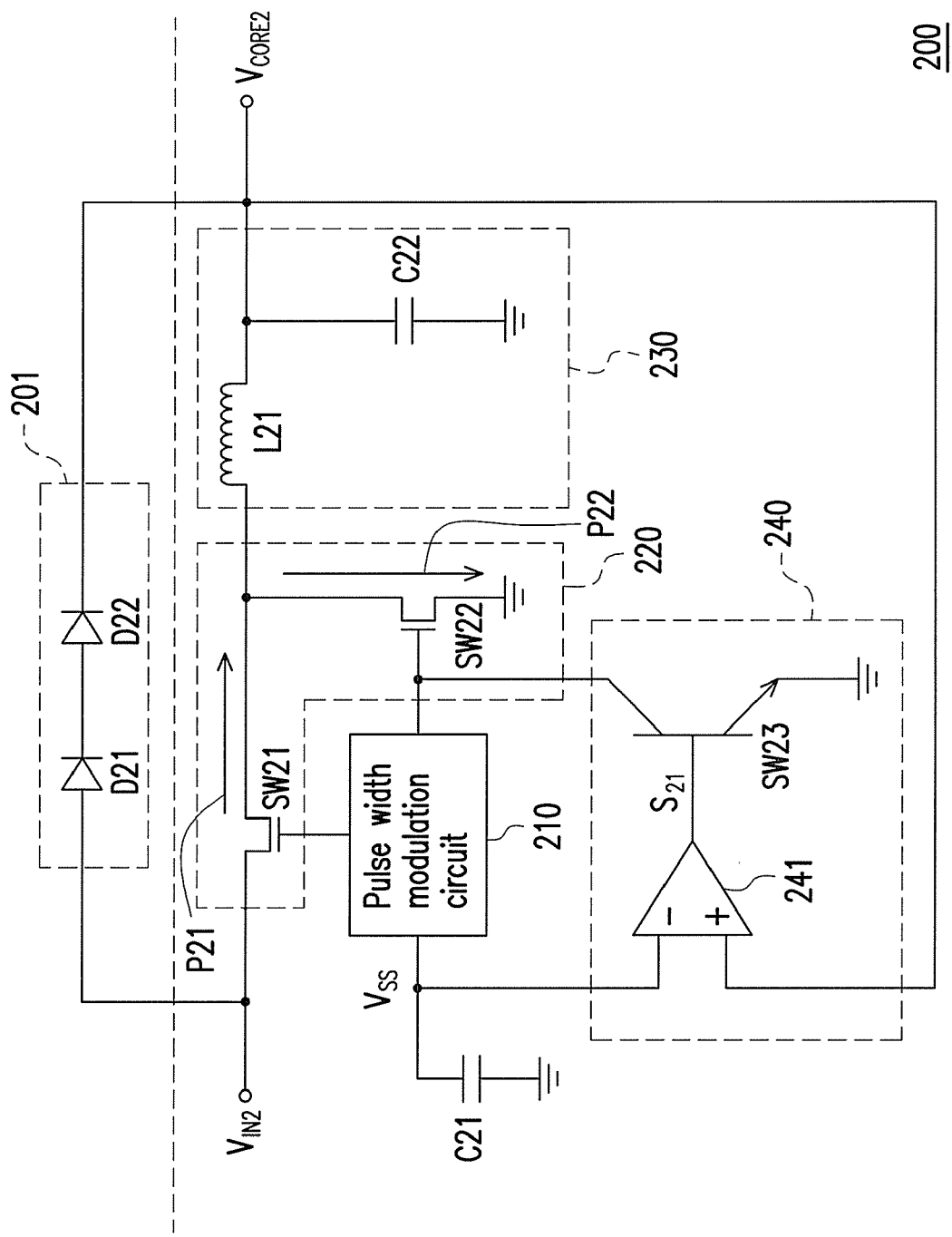
FIG. 2 is a circuit diagram of a power converting device according to an embodiment of the present invention.

FIG. 2 is a circuit diagram of the power converting device according one embodiment of the present invention. Specifically, FIG. 2 illustrates a relation between a power converting device 200 and an application specific integrated circuit 201 when this embodiment is carried out. Herein, the power converting device 200 is used for converting an input voltage $V_{IN2}$ into a core voltage $V_{CORE2}$. The application specific integrated circuit 201 performs corresponding operations by using the input voltage $V_{IN2}$ and the core voltage $V_{CORE2}$. Moreover, an inner transistor of the application specific integrated circuit 201 forms a circuit structure equivalent to diodes D21 and D22, and the circuit structure is electrically connected between two terminals of the power converting device 200.

Referring to FIG. 2, the power converting device 200 includes a pulse width modulation circuit 210, a switch unit 220, a power output unit 230, and a voltage start unit 240. Herein, the switch unit 220 is electrically connected to the pulse width modulation circuit 210 and the voltage start unit 240. The power output unit 230 is electrically connected to the switch unit 220 and the voltage start unit 240.

Herein, the pulse width modulation circuit 210 includes a capacitor C21. Specifically, the capacitor C21 is used for storing a start voltage $V_{SS}$. The pulse width modulation circuit 210 increases the start voltage $V_{SS}$ in a soft start mode, so as to delay the generation of a core voltage $V_{CORE2}$. In addition, the pulse width modulation circuit 210 operates under the start voltage $V_{SS}$ to generate a pulse width modulation signal.

On the other hand, the switch unit 220 includes a switch SW21 and a switch SW22. Herein, a first terminal of the switch SW21 is used for receiving an input voltage $V_{IN2}$, and a control terminal of the switch SW21 is electrically connected to the pulse width modulation circuit 210. Furthermore, a first terminal of the switch SW22 is electrically connected to a second terminal of the switch SW21 and the power output unit 230, a second terminal of the switch SW22 is electrically connected to a ground, and a control terminal of the switch SW22 is electrically connected to the pulse width modulation circuit 210 and the voltage start unit 240.

In view of the whole operation, the switch unit 220 alternately turns on the switch SW21 and the switch SW22 according to the pulse width modulation signal outputted by the pulse width modulation circuit 210. For instance, provided that the switch unit 220 turns on the switch SW21 and turns off the switch SW22 according to the pulse width modulation signal at this moment, the switch SW21 is turned off and the switch SW22 is turned on according to the pulse width modulation signal in the next step. That is to say, the switches SW21 and SW22 are turned on by turns.

More specifically, when the switch SW21 is turned on and the switch SW22 is turned off, the switch unit 220 forms a charge path P21 for transmitting the input voltage $V_{IN2}$ to the power output unit 230. On the contrary, when the switch SW21 is turned off and the switch SW22 is turned on, the switch unit 220 forms a discharge path P22 for preventing the input voltage $V_{IN2}$ from being transmitted to the power output unit 230. Thereby, the switch unit 220 alternately forms the charge path P21 and the discharge path P22 according to the pulse width modulation signal.

Further, the power output unit 230 includes an inductance L21 and a capacitor C22. Herein, a first terminal of the inductance L21 is connected to the second terminal of the switch SW21. A first terminal of the capacitor C22 is electrically connected to a second terminal of the inductance L21, and a second terminal of the capacitor C22 is electrically connected to the ground. To be more detailed, when the charge path P21 is formed, the input voltage $V_{IN2}$ is converted into a current by the inductance L21, so as to charge the capacitor C22. At the same time, a level of the core voltage $V_{CORE2}$ is increased.

On the contrary, when the discharge path P22 is formed, the capacitor C22 is discharged through the discharge path P22 to reduce the level of the core voltage $V_{CORE2}$. As the switches SW21 and SW22 are constantly switched, the charge path P21 and the discharge path P22 are alternately formed to generate periodic changes of the core voltage $V_{CORE2}$. Accordingly, the power output unit 230 converts the input voltage $V_{IN2}$ into the core voltage $V_{CORE2}$ in accordance with the charge path P21 and the discharge path P22 formed by the switch unit 220.

It is worth noting that, in this embodiment, the switch unit 220 is controlled by the voltage start unit 240, so as to prevent the application specific integrated circuit 201 from affecting the power converting device 200 during soft start mode. An operation mechanism of the voltage start unit 240 is further explained in the following paragraphs.

Referring to FIG. 2, the voltage start unit 240 includes an operation amplifier 241 and a switch SW23. More specifically, a first input terminal of the operation amplifier 241 is used for receiving the start voltage $V_{SS}$, a second input terminal of the operation amplifier 241 is used for receiving the core voltage $V_{CORE2}$, and an output terminal of the operation amplifier 241 is used for outputting a detection signal $S_{21}$. In addition, a first terminal of the switch SW23 is electrically connected to the control terminal of the switch SW22, and a second terminal of the switch SW23 is electrically connected to the ground. Further, a control terminal of the switch SW23 is electrically connected to the output terminal of the operation amplifier 241.

In view of the whole operation, the operation amplifier 241 compares the voltage values of the start voltage $V_{SS}$ and the core voltage $V_{CORE2}$, and outputs the detection signal $S_{21}$ when the start voltage $V_{SS}$ is smaller than the core voltage $V_{CORE2}$. Moreover, the switch SW23 turns on the first terminal and the second terminal thereof according to the detection signal $S_{21}$, so as to generate a control signal outputted by the voltage start unit 240. In the meantime, the switch SW22 in the switch unit 220 is turned off, and the discharge path P22 is not formed.

In other words, the voltage start unit 240 is used for detecting the start voltage $V_{SS}$ and transmitting the control signal when the start voltage $V_{SS}$ is smaller than the core voltage $V_{CORE2}$, so as to interrupt the formation of the discharge path P22. Accordingly, when the power converting device 200 is in soft start mode, the switch SW22 in the switch unit 220 is timely turned off, with a result that the input voltage $V_{IN2}$, which leaks to the output terminal of the power converting device 200 through the diodes D21 and D22, is not able to be discharged via the inductance L21 and the switch SW22.

That is, during the soft start process, the power converting device 200 is not influenced by the application specific integrated circuit 201 and is able to operate properly and convert the input voltage $V_{IN2}$ into the core voltage $V_{CORE2}$. It should also be noted that, in this embodiment, the control signal outputted from the voltage start unit 240 is formed by a signal from the ground. Therefore, the switch SW22 described in this embodiment may be constituted of an N-type transistor, such that the switch SW22 is not able to turn on the first terminal and the second terminal thereof according to the control signal.

In conclusion of the above, the present invention is to operate the switch unit by using the voltage start unit and the pulse width modulation circuit. Thereby, when the power converting device is in the soft start mode, the voltage start unit timely generates the control signal, so as to break off the discharge path for discharging the input voltage. As a result, in the soft start mode, the power converting device is free from the influence of the application specific integrated circuit and is able to convert the input voltage into the core voltage properly.

Although the present invention has been disclosed by the above embodiments, they are not intended to limit the present invention. Any person having ordinary knowledge in the art may make modifications and variations without departing from the spirit and scope of the present invention. Therefore, the protection scope sought by the present invention falls in the appended claim.

What is claimed is:

1. A power converting device, comprising:
   a pulse width modulation circuit, for increasing a start voltage in a soft start mode and operating under the start voltage to generate a pulse width modulation signal;
   a switch unit, for receiving an input voltage and alternately forming a charge path and a discharge path according to the pulse width modulation signal;
   a power output unit, electrically connected to the switch unit for converting the input voltage to a core voltage in accordance with the charge path and the discharge path formed by the switch unit; and
   a voltage start unit, for detecting the start voltage and transmitting a control signal to interrupt the formation of the discharge path when the start voltage is smaller than the core voltage.

2. The power converting device as claimed in claim 1, wherein the switch unit comprises:
   a first switch, having a first terminal for receiving the input voltage and a control terminal electrically connected to the pulse width modulation circuit; and
   a second switch, having a first terminal electrically connected to the second terminal of the first switch and the power output unit, a second terminal electrically connected to a ground, and a control terminal electrically connected to the pulse width modulation circuit and the voltage start unit,
   wherein the switch unit alternately turns on the first switch and the second switch according to the pulse width modulation signal, so as to form the charge path when the first switch is turned on and form the discharge path when the second switch is turned on, and furthermore, the switch unit turns off the second switch according to the control signal, so as to interrupt the formation of the discharge path.

3. The power converting device as claimed in claim 2, wherein the voltage start unit comprises:
   an operation amplifier, for receiving the start voltage and the core voltage, and outputting a detection signal when the start voltage is smaller than the core voltage; and
   a third switch, having a first terminal electrically connected to the control terminal of the second switch, a second terminal electrically connected to the ground, and a control terminal electrically connected to the operation amplifier, wherein the third switch turns on the first terminal and the second terminal thereof according to the detection signal, so as to generate the control signal.

4. The power converting device as claimed in claim 3, wherein the second switch is constituted of an N-type transistor.

5. The power converting device as claimed in claim 2, wherein the power output unit comprises:
   an inductance, having a first terminal electrically connected to the second terminal of the first switch; and
   a first capacitor, having a first terminal electrically connected to a second terminal of the inductance and a second terminal electrically connected to the ground.

6. The power converting device as claimed in claim 1, wherein the pulse width modulation circuit comprises a second capacitor for storing the start voltage.

7. The power converting device as claimed in claim 1 is adapted for a server, and an application specific integrated circuit in the server performs corresponding operations by the input voltage and the core voltage.

* * * * *